March 15, 1927.
N. I. WOOLSEY
1,621,300
VALVE STEM CAP
Filed Sept. 10, 1925     2 Sheets-Sheet 1
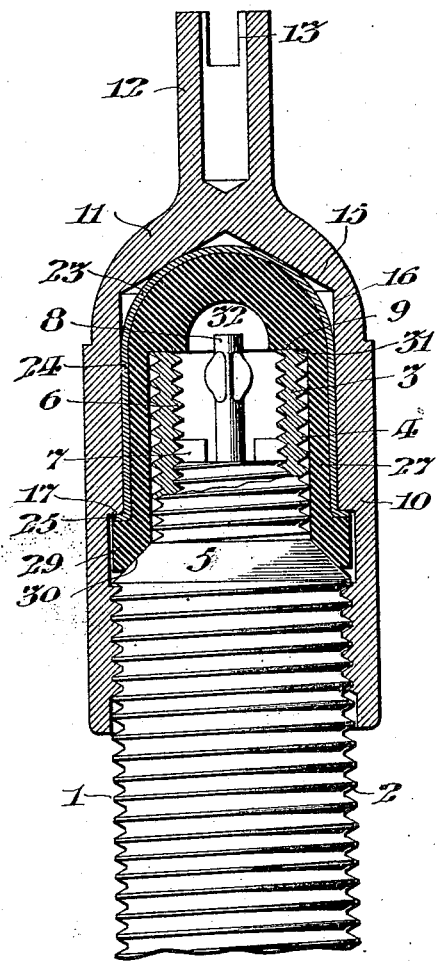
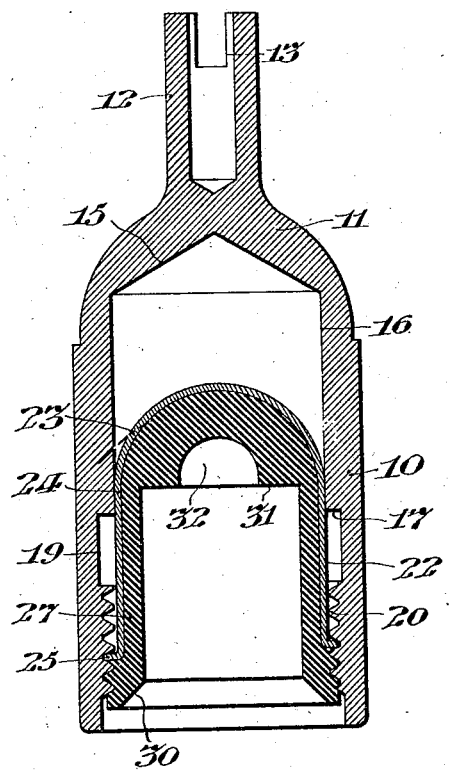
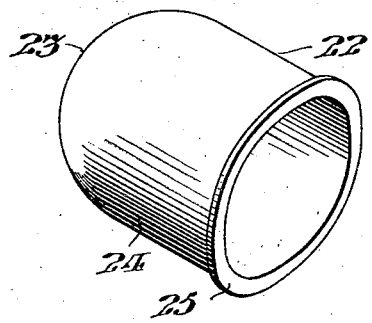
Inventor
Nicholas I. Woolsey,
By Clifton C. Hallowell
Attorney March 15, 1927.
N. I. WOOLSEY
1,621,300
VALVE STEM CAP
Filed Sept. 10, 1925    2 Sheets-Sheet 2
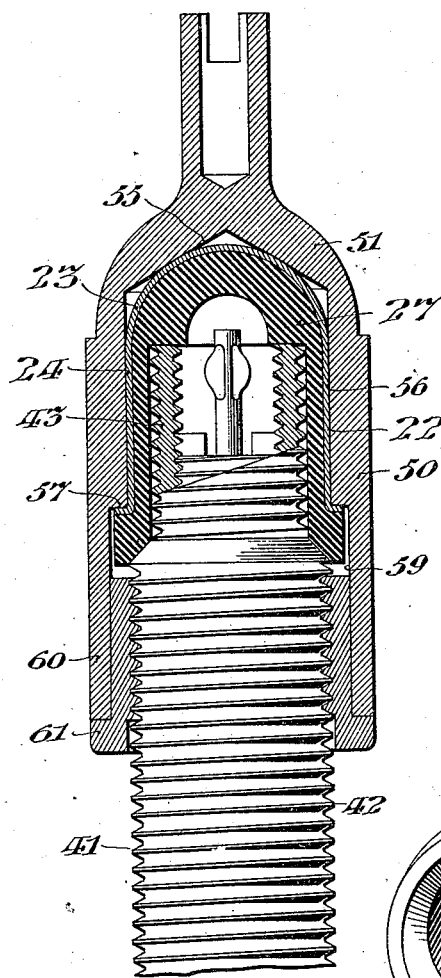
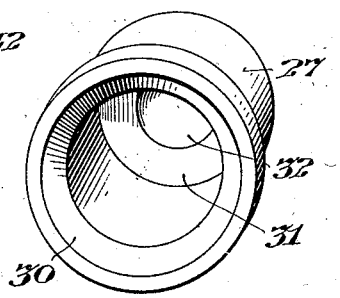
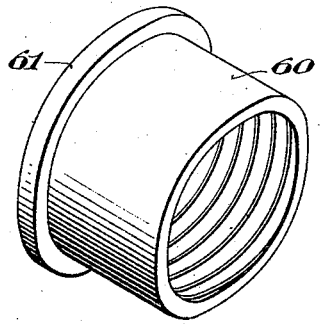
Inventor
Nicholas I. Woolsey,
By Clifton C. Hallowell
Attorney Patented Mar. 15, 1927.

1,621,300

UNITED STATES PATENT OFFICE.

NICHOLAS I. WOOLSEY, OF TOTTENVILLE, NEW YORK.

VALVE-STEM CAP.

Application filed September 10, 1925. Serial No. 55,457.

My invention relates particularly to that class of caps that are adapted to be screwed on the valve stem to prevent leakage of air through the valve in said stem, and is especially directed to caps having stem sealing means that is so swivelly contained in the cap as to relatively rotate therein when the cap is rotated to engage it with the stem and thereby prevent dragging of the sealing medium on the seat provided therefor on said valve stem.

The standard form of valve stem comprises a tubular body providing a valve housing which is exteriorly threaded to receive a dust cap, and which terminates in a reduced threaded neck or nipple providing a frustro-conical shoulder spaced from the end of said nipple, and upon which nipple a valve cap is usually threaded to seal the valve in said stem.

The principal objects of my invention are to provide a cap that will efficiently seal the valve and exclude dust, and that is provided with sealing means arranged to engage both the free end of the valve stem, and the shoulder at the base of the nipple with equal facility.

Other objects of my invention are to provide a valve-stem cap with a shell or thimble swivelly disposed therein and serving as a mounting for removably and replaceably supporting a resilient cup which so embraces the nipple of the valve stem as to guide the cap into position and to afford a double-seated seal to prevent possible leakage of the valve.

My invention includes a valve-stem cap provided with a swiveling shell which not only bears against the inner end wall of the cap, but which has an annular flange arranged to bear against a suitably formed shoulder in said cap, and also serves as a protection for the free edge of the resilient cupped washer.

My invention comprehends a valve-stem cap having a washer reinforcing mounting which is provided with a radially extended flange projecting beyond the inner diameter of the screw threads of said cap and arranged to be retained thereby, but being capable of being entered into said cap by utilizing said flange as a thread and twisting or turning said mounting in co-operative engagement with said screw threads until said flange has passed into the cap beyond the threads.

Specifically stated, the form of my invention as hereinafter described comprises a valve-stem cap for a tire valve-stem having a threaded exterior and a reduced threaded nipple forming a frustro-conical shoulder, said cap being internally threaded toward its free open end to engage the external threads of said valve-stem, and being provided with a bore or cavity having a conical inner wall arranged to receive a thimble-like shell having an outwardly extended flange, and serving as a casing or mounting for a cupped washer of resilient material, which is arranged to embrace said nipple, and which has an enlarged peripheral rim arranged to engage the seat formed by the frustro-conical shoulder at the base of said nipple, while the inner end wall of said resilient washer engages the free open end of said nipple.

My invention also includes all of the various novel features of construction and arrangement as hereinafter more definitely specified.

In the accompanying drawings, Figure 1 is a central longitudinal sectional view of a valve cap constructed in accordance with my invention, as applied to a fragment of a valve-stem which is shown partly in elevation and partly in section for convenience of illustration; Fig. 2 is a central longitudinal sectional view of the valve cap showing the resilient cupped sealing washer and its mounting shell partly inserted in the valve cap, and in the course of being entered into said cap; Fig. 3 is a perspective view of the swiveling mounting shell; Fig. 4 is a perspective view of the resilient cupped sealing washer; Fig. 5 is a view similar to Fig. 1, but showing the valve cap adapted to be engaged with a valve-stem of slightly different construction; Fig. 6 is a perspective view of the threaded bushing serving as an adapter to the modified valve-stem, for the valve cap shown in Fig. 5; and Fig. 7 is a perspective view of the resilient cupped sealing washer shown in Fig. 5 so viewed as to show its respective seat engaging surfaces.

In the form of my invention as shown in Figures 1, 2, 3 and 4, the valve stem 1 is of standard construction and proportions, having the external screw threads 2 and having the reduced neck or nipple 3 provided with screw threads 4, and affording the frustro-conical shoulder 5, said nipple 3 being also provided with the internal screw threads 6 with which the inside valve body 7 is so engaged that the valve-rod 8 projects slightly beyond the free end 9 of the valve-stem nipple 3 as shown.

The valve cap comprises the hollow cylindrical body 10, having the closed dome-shaped end 11 provided with the usual axially extended hollow shank 12, which is provided with the oppositely disposed notches 13 for manipulation of the valve body 7, and by which said valve casing may be rotated into or out of the threaded bore of the valve-stem 1, in a manner well known.

The bore of the valve-stem cap terminates in the inner conical wall 15, which is connected by the cylindrical wall 16 with the shoulder 17 formed by the enlarged recess 19 between said cylindrical wall and the internal threads 20, which extend outwardly therefrom to the open end of said cap.

Within the recess formed by the bore of the valve-stem cap, is disposed the thimble-like shell comprising the swiveling casing 22 having the semi-spherical closed end wall 23, merging in the cylindrical wall 24, and terminating in the outwardly extending annular flange 25, the semi-spherical end wall 23 bearing against the conical wall 15 of the bore of the cap, while the flange 25 bears against the shoulder 17 for relative rotation with respect to said valve-stem cap.

The swiveling shell 22 serves as a housing or mounting for the resilient cupped washer forming a hood 27, which is formed of resilient material, preferably rubber, and conforms substantially to the shape of the casing shell 22, and has the enlarged rim 29, overlying the flange 25, and chamfered as at 30 to fit upon the seat formed by the frustro-conical shoulder 5 of the valve-stem, while the inner end wall 31 of its bore, bears against the free outer end of the valve-stem nipple 3, said wall 31 having therein the central recess 32 arranged to receive the projecting end of the valve-rod 8.

It will be seen from an inspection of the drawings that the flange 25 of the shell 22 and the enlarged rim 29 of the cup-shaped washer 27 are of greater diameter than the internal diameter of the threads 20, and the sealing unit thus formed is prevented from accidental displacement thereby. In the assembly, however, of the sealing unit comprising the washer 27 and its casing 22, with the valve-stem cap, said unit may be entered into the hollow of the cap by threading the flange 25 through the internal threads of the cap, as shown in Fig. 2, until said flange 25 and the enlarged rim 29 have passed into the enlarged recess 19 provided therefor in the valve-stem cap.

It will be obvious that as the cap is screwed down on the valve-stem, the chamfered surface 30 of the resilient cupped washer will engage the frustro-conical seat 5 of the valve stem and the inner wall 31 of the cup washer will engage the end of the valve-stem nipple and thereby provide a double-seat seal to prevent any escape of air that might leak out through any defect in the valve in the valve stem.

The valve-stem 41, shown in Fig. 5, is typical of a make of valve used on a specific make of automobile, and is of slightly less diameter than the standard valve-stem, being provided, however, with the threads 42, and having the reduced nipple 43 provided with the screw threads 44. In this form of my invention, the valve-stem cap comprises the cylindrical wall 50 and has the closed dome-shaped end 51. The bore forming the recess therein terminates in an inner conical wall 55, which is connected by the cylindrical wall 56 with the shoulder 57 formed by the enlarged cylindrical wall 59 affording a smooth bore extending from said shoulder to the outer end of said cap.

Within the bore formed by the cylindrical wall 59, the internal threaded bushing 60, having a peripheral flange 61, is forced and serves to prevent the accidental displacement of the valve-stem sealing unit, such as is employed with the valve-stem cap shown in Figs. 1 to 4 inclusive.

My invention is advanageous in that when it is found that the resilient cupped washer 27 has served its usefulness and has become worn or otherwise defective, it may be withdrawn from its mounting comprising the shell 22, through the threaded end of the valve-stem cap and may be replaced by forcing a new one through the threaded end of said cap into place in its mounting.

Furthermore, it will be obvious that the natural length of the cupped washer 27 may be so varied by pressure as to insure a seal tight joint bolt at the seats at the end of the stem and at the frustro-conical shoulder, and, therefore, any variation in the relative spacing of said seats may be thus compensated by such pressure, and that this variation is greatly facilitated by the fact that one seat is flat or normal to the axis of the stem, while the other seat is inclined, the inclined seat having a tendency to cause a relatively greater yielding of the washer than the flat seat.

I do not desire to limit my invention to the precise details of construction and arrangement as herein set forth, as it is obvious that various modifications may be made therein without departing from the essential features of my invention as defined in the appended claims.

Having thus described my invention, I claim:

1. A valve-stem cap having a resilient washer arranged to embrace the end of a valve-stem and arranged to seal relatively spaced seats on said stem.

2. A valve-stem cap having a rubber cup-shaped washer arranged to embrace the end portion of a valve-stem and having a flat shoulder arranged to engage the free end of said stem and a chamfered surface arranged to engage a frustro-conical seat spaced from the free end of said stem.

3. A cap for a valve-stem having external screw threads and a reduced nipple forming a conical shoulder, comprising a hollow body having an internal smooth cylindrical inner region, a threaded outer region and an enlarged intermediate recess, a swivel shell arranged to be passed through said threaded region and to fit into said cylindrical region and having a peripheral flange extended radially and of larger diameter than the inner diameter of the threads of said outer region but arranged to be threaded through the troughs of said threads and passed thereby into said recess.

4. A cap for exteriorly threaded valve-stem having a reduced neck forming a shoulder, provided with an elastic sealing hood having a double seated sealing means arranged to simultaneously seat against said shoulder and the end of said neck.

In witness whereof, I have hereunto set my hand this second day of September, A. D. 1925.

NICHOLAS I. WOOLSEY.